US011262800B2

(12) United States Patent
Kim et al.

(10) Patent No.: US 11,262,800 B2
(45) Date of Patent: Mar. 1, 2022

(54) FOLDABLE ELECTRONIC DEVICE SUPPORTING MULTIWINDOW

(71) Applicant: Samsung Electronics Co., Ltd., Suwon-si (KR)

(72) Inventors: Joon Hwan Kim, Yongin-si (KR); Sun Hee Kang, Seoul (KR); Ji Eun Yang, Seoul (KR); Sun Mi You, Suwon-si (KR); Kwang Bae Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 16/645,969

(22) PCT Filed: Sep. 18, 2018

(86) PCT No.: PCT/KR2018/010953
§ 371 (c)(1),
(2) Date: Mar. 10, 2020

(87) PCT Pub. No.: WO2019/054839
PCT Pub. Date: Mar. 21, 2019

(65) Prior Publication Data
US 2020/0278720 A1 Sep. 3, 2020

(30) Foreign Application Priority Data
Sep. 18, 2017 (KR) ........................ 10-2017-0119854

(51) Int. Cl.
*G06F 1/16* (2006.01)

(52) U.S. Cl.
CPC .......... *G06F 1/1641* (2013.01); *G06F 1/1652* (2013.01)

(58) Field of Classification Search
CPC ................. G06F 1/1641; G06F 1/1652; G06F 2200/1637; G06F 1/1647; G06F 1/1677;
(Continued)

(56) References Cited

U.S. PATENT DOCUMENTS 9,436,217 B2   9/2016 Sirpal et al.
9,571,734 B2   2/2017 Kwak et al.
(Continued)

FOREIGN PATENT DOCUMENTS

KR   10-2014-0046344 A   4/2014
KR   10-101389442 A      4/2014
(Continued)

*Primary Examiner* — Rockshana D Chowdhury
(74) *Attorney, Agent, or Firm* — Jefferson IP Law, LLP

(57) ABSTRACT

An electronic device includes a body including a first portion and a second portion, a display including a first display area and a second display area, and a processor embedded inside the body. The first portion and the second portion rotate about a rotation axis. The first display area is disposed in the first portion. The second display area is disposed in the second portion. The processor is configured to execute a plurality of applications in the first display area by a first division line in a state where the body is folded by rotation of the first portion and the second portion and to execute the plurality of applications in the first display area and the second display area by a second division line parallel to the rotation axis in a state where the body is unfolded by the rotation of the first portion and the second portion.

12 Claims, 13 Drawing Sheets

(58) Field of Classification Search
CPC .............. G06F 1/1616; H04M 1/0241; H04M 2250/16; H04M 1/72454; H04M 1/0214
See application file for complete search history.

(56) References Cited

U.S. PATENT DOCUMENTS

| | | | |
|---|---|---|---|
| 10,254,863 B2* | 4/2019 | Shin | G06F 1/1677 |
| 10,289,258 B2* | 5/2019 | Lee | G06F 1/1643 |
| 2012/0218302 A1 | 8/2012 | Sirpal et al. | |
| 2014/0098188 A1 | 4/2014 | Kwak et al. | |
| 2014/0129739 A1 | 5/2014 | King | |
| 2019/0034147 A1* | 1/2019 | Koki | G06F 3/0488 |

FOREIGN PATENT DOCUMENTS

| | | |
|---|---|---|
| KR | 10-2016-0032079 A | 3/2016 |
| KR | 10-2016-0097415 A | 8/2016 |
| KR | 10-2017-0074726 B1 | 6/2017 |

* cited by examiner

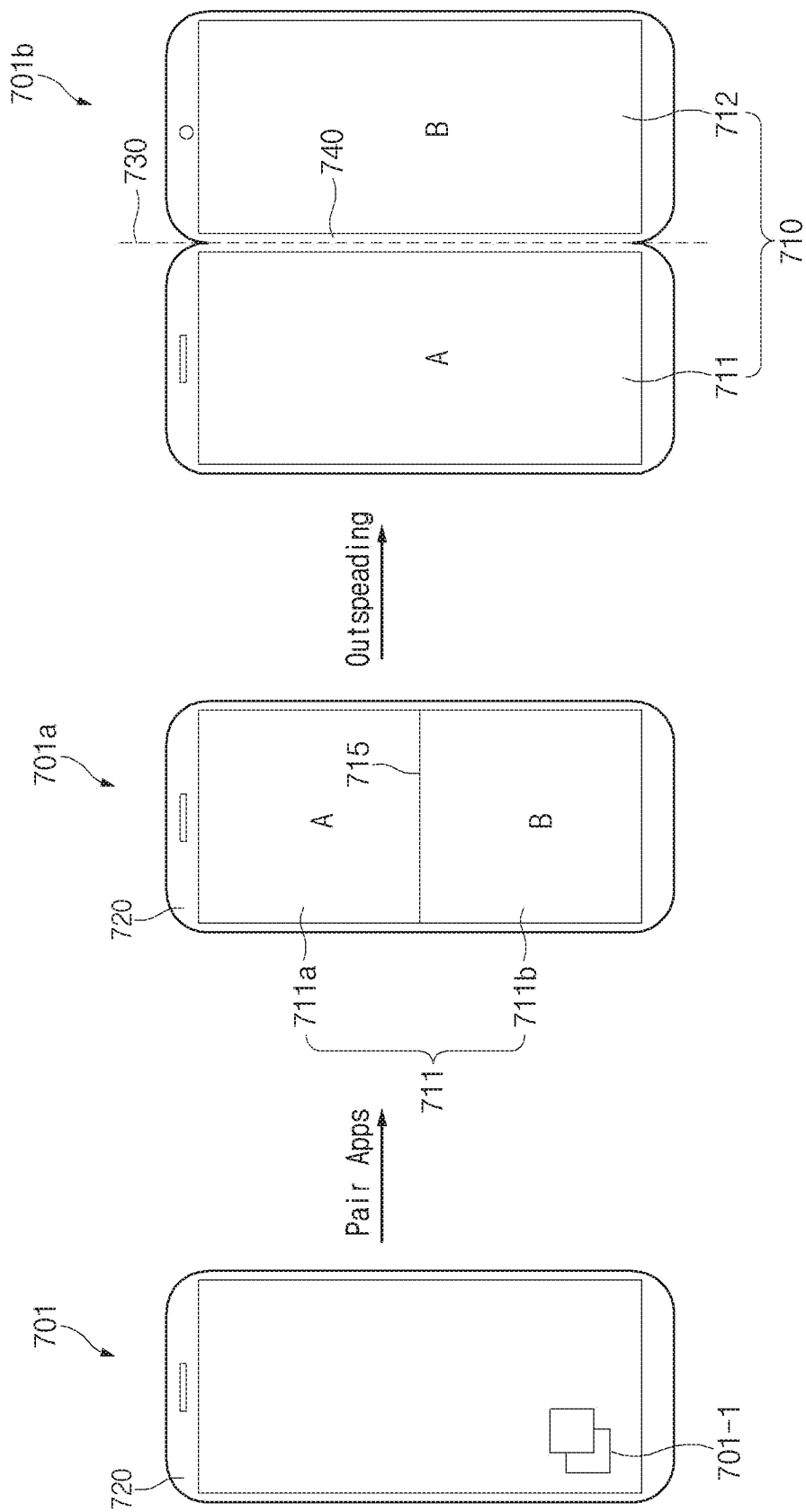

FOLDABLE ELECTRONIC DEVICE SUPPORTING MULTIWINDOW

TECHNICAL FIELD

The present disclosure relates to a foldable electronic device supporting multi-windows.

BACKGROUND ART

An electronic device such as a smartphone, a tablet PC, or the like may output various pieces of content through a display panel. The electronic device equipped with various types of displays such as a side surface display, an edge display, and the like has been developed. In addition, a foldable electronic device to be used with a display folded or unfolded has been recently developed

DISCLOSURE

Technical Problem

In the case where a conventional electronic device operates in the manner of multi-windows or multi-tasking, the conventional electronic device may divide a display in a specified direction and may simultaneously execute a plurality of applications. For example, multi-windows of a plurality of applications may be output in the manner of up/down placement (in the case of a portrait mode) or left/right placement (in the case of a landscape mode). The conventional electronic device may compare the width of the display with the height of the display and may divide the display in a direction corresponding to the longer one of the width and the height, and the plurality of applications may be executed in the multi-window scheme.

In the case where a method of dividing a display by comparing the width of the display with the height of the display is applied to a foldable electronic device, the screen may be divided depending on the screen size (or ratio) of the width/height and then multi-windows may be displayed in the form that is not suitable for screen features of the foldable electronic device. In addition, in the case where a user folds or unfolds the foldable electronic device, the screen configuration changes rapidly or may be output in a direction in which it is inconvenient for a user to watch the screen.

Technical Solution

According to various embodiments of the present disclosure, a foldable electronic device may divide a screen in the various manners depending on the folded state or unfolded state of a display.

In accordance with an aspect of the present disclosure, an electronic device may include a body including a first portion and a second portion, a display including a first display area and a second display area, and a processor embedded inside the body. The first portion and the second portion may rotate about a rotation axis. The first display area may be disposed in the first portion. The second display area may be disposed in the second portion. The processor may be configured to execute a plurality of applications in the first display area by a first division line in a state where the body is folded by rotation of the first portion and the second portion and to execute the plurality of applications in the first display area and the second display area by a second division line parallel to the rotation axis in a state where the body is unfolded by the rotation of the first portion and the second portion.

Advantageous Effects

According to various embodiments of the present disclosure, a foldable electronic device may divide a screen in the various manners depending on the folded state or unfolded state of a display to operate in the multi-window scheme.

According to various embodiments of the present disclosure, the foldable electronic device may divide the screen in the various manners depending on the features of a dual display or a flexible display to operate in the multi-window scheme.

According to various embodiments of the present disclosure, in a foldable display having various ratios, the foldable electronic device may maintain the natural change of the screen.

DESCRIPTION OF DRAWINGS

FIG. 7a is an exemplification diagram illustrating execution of a pair icon in a folded state, according to various embodiments;

MODE FOR INVENTION

Figure 1A:
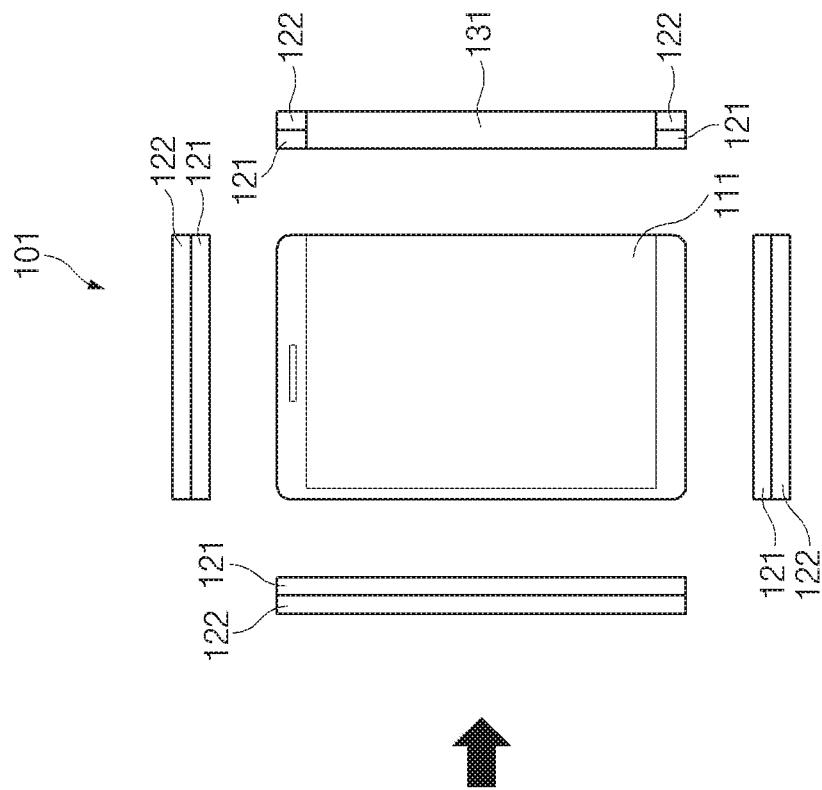
FIG. 1a illustrates a foldable electronic device, according to various embodiments.
Figure 1A:
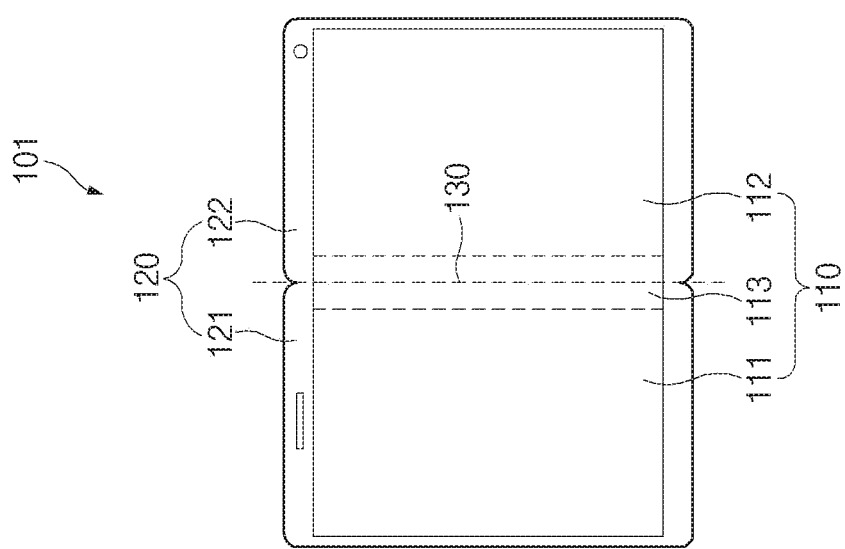

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1a illustrates a foldable electronic device, according to various embodiments.

Referring to FIG. 1a, an electronic device 101 may include a display 110 and a body (or housing) 120. In the electronic device 101, the display 110 and the body 120 may be folded or unfolded about a specified rotation axis 130 (foldable electronic device). The rotation axis 130 may be the center axis of a rotation part (not illustrated) (e.g., hinge) disposed in the center area of the body 120 or a virtual axis extending in parallel to the center axis.

The display 110 may output content such as an image, a text, or the like. The display 110 may receive a user's touch input to provide the touch input to an internal processor (not illustrated).

According to various embodiments, the display 110 may include a first display area 111, a second display area 112, or a flexible area 113. In an embodiment, the first display area 111, the second display area 112, and the flexible area 113 may be implemented with one display panel. In another embodiment, the first display area 111, the second display area 112, and the flexible area 113 may be implemented with display panels different depending on each area.

The first display area 111 may be an area seated in a first portion 121 of the body 120. In the case where the electronic device 101 is unfolded, the first display area 111 may form one plane with the second display area 112. In this case, the first display area 111 may face a direction the same as the direction of the second display area 112.

In the case where the body 120 is folded, the first display area 111 and the second display area 112 may face different directions from each other. For example, in the case where the body 120 is folded, the first display area 111 may face a first direction, and the second display area 112 may face a second direction opposite to the first direction. The first display area 111 may be in a state in which the first display area 111 is parallel to the second display area 112.

The second display area 112 may be an area seated in a second portion 122 of the body 120. In the case where the electronic device 101 is unfolded, the second display area 112 may form one plane with the first display area 111. In this case, the second display area 112 may face a direction the same as the direction of the first display area 111.

In the case where the body 120 is folded, the second display area 112 and the first display area 111 may face different directions from each other. In this case, the second display area 112 may be in a state in which the second display area 112 is parallel to the first display area 111.

In the case where the body 120 is folded, the flexible area 113 may be bent in a specified direction. In the case where the body 120 is unfolded, the flexible area 113 may form one plane with the first display area 111 and the second display area 112.

The body 120 may fix the display 110. The body 120 may mount a button, a sensor window, a camera lens, a speaker, or the like on the outside. The body 120 may include a processor, a memory, a communication module, a battery, or the like, which drives the electronic device 101, in the inside.

The body 120 may include the first portion 121 and the second portion 122. The first portion 121 may fix the first display area 111 of the display 110. The second portion 122 may fix the second display area 112 of the display 110.

The first portion 121 and the second portion 122 may rotate about the rotation axis 130. In the case where the body 120 is folded depending on the rotation of the first portion 121 and the second portion 122, the first display area 111 mounted in the first portion 121 and the second display area 112 mounted in the second portion 122 may face different directions (e.g., directions opposite to each other).

In a state (hereinafter referred to as a "folded state") where the body 120 is folded, the first display area 111, the second display area 112, or the flexible area 113 may be in different states from one another. For example, in the folded state, the first display area 111 may be in an activation state (while operating or being turned on depending on a user input), and the second display area 112 may be in an off state (while not recognizing a separate user input). The flexible area 113 may be used for a side surface display.

According to various embodiments, in a state (hereinafter referred to as an "unfolded state") where the body 120 is unfolded, the first display area 111, the second display area 112, or the flexible area 113 may operate as one screen as a whole. For example, one application may be executed in one window corresponding to all of the first display area 111, the second display area 112, or the flexible area 113.

According to various embodiments, in the unfolded state, the first display area 111, the second display area 112, or the flexible area 113 may be divided along a specified division line and then may display execution windows of a plurality of applications at the same time. The extending direction of the division line may be parallel or perpendicular to the rotation axis 130. Additional information about a multi-window operation of a folded state or an unfolded state may be provided through FIGS. 2 to 8.

Figure 1B:
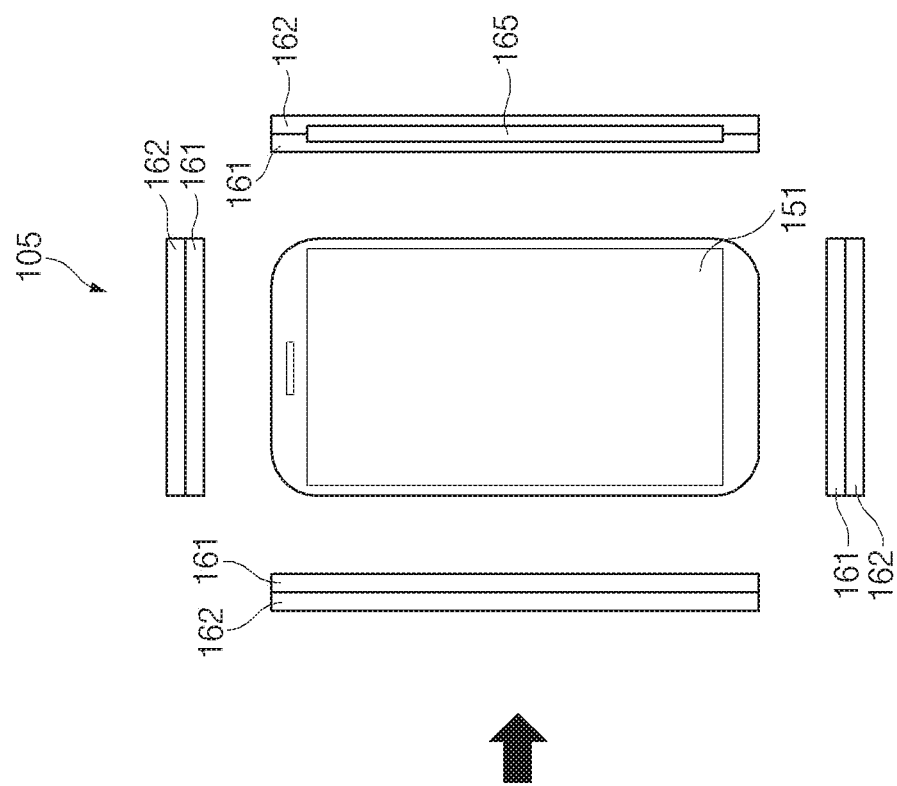
FIG. 1b illustrates an electronic device including a dual display, according to various embodiments.
Figure 1B:
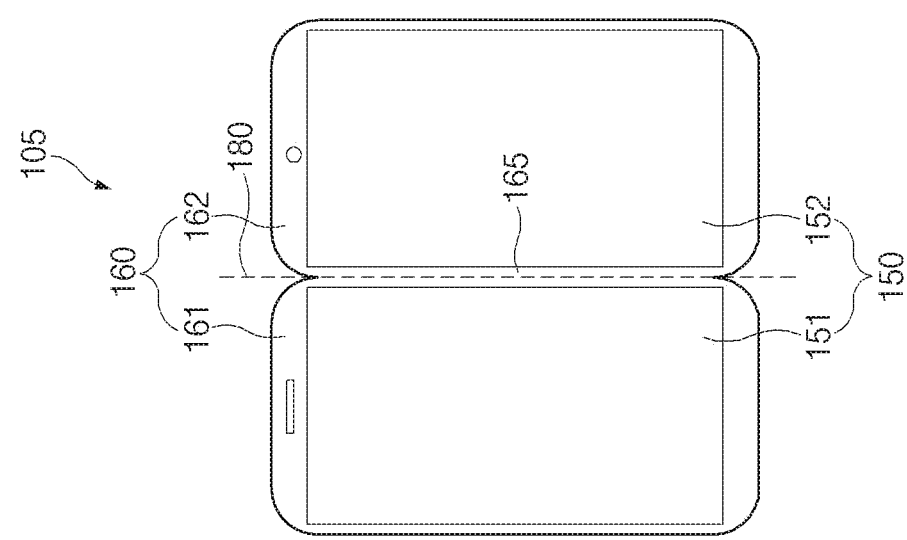

FIG. 1*b* illustrates an electronic device including a dual display, according to various embodiments.

Referring to FIG. 1*b*, an electronic device 105 may include a display 150 and a body (or housing) 160. In the electronic device 105, the body 160 may be folded or unfolded about a specified rotation axis 180. The rotation axis 180 may be the center axis of a rotation part (not illustrated) (e.g., hinge) disposed in the center area of the body 160 or a virtual axis extending in parallel to the center axis.

Unlike the display 110 in FIG. 1*a*, the display 150 may include a first display area 151 and a second display area 152 that are physically divided through a bezel 165. The first display area 151 and the second display area 152 may be implemented with different display panels from each other.

The first display area 151 may be an area seated in a first portion 161 of the body 160. In the case where the electronic device 105 is unfolded, the first display area 151 may form one plane with the second display area 152. In this case, the first display area 151 may face a direction the same as the direction of the second display area 152.

In the case where the body 160 is folded, the first display area 151 and the second display area 152 may face different directions from each other. For example, in the case where the electronic device 105 is folded, the first display area 151 may face a first direction, and the second display area 152 may face a second direction opposite to the first direction. The first display area 151 may be in a state in which the first display area 111 is parallel to the second display area 152.

The second display area 152 may be an area seated in a second portion 162 of the body 160. In the case where the body 160 is unfolded, the second display area 152 may form the same plane with the first display area 151. In this case, the second display area 152 may face a direction the same as the direction of the first display area 151.

In the case where the body 160 is folded, the second display area 152 and the first display area 151 may face different directions from each other. In this case, the second display area 152 may be in a state in which the second display area 112 is parallel to the first display area 151.

The body 160 may fix the display 150. The body 160 may mount a button, a sensor window, a camera lens, a speaker, or the like on the outside. The body 160 may include a processor, a memory, a communication module, a battery, or the like, which drives the electronic device 105, in the inside.

The body 160 may include the first portion 161 and the second portion 162. The first portion 161 may fix the first display area 151. The second portion 162 may fix the second display area 152.

The first portion 161 and the second portion 162 may rotate about the rotation axis 180. In the case where the first portion 161 and the second portion 162 rotate and then the body 160 is folded, the first display area 151 mounted in the first portion 161 and the second display area 152 mounted in the second portion 162 may face different directions (e.g., directions opposite to each other).

In a state where the body 160 is folded, the first display area 151 or the second display area 152 may be in different operation states. For example, in the folded state, the first display area 151 may be in an activation state (while operating or being turned on depending on a user input), and the second display area 152 may be in an off state (while not recognizing a separate user input).

According to various embodiments, in a state where the body 160 is unfolded, the first display area 151 and the second display area 152 may operate as one screen as a whole. For example, one application may be executed in one window corresponding to all of the first display area 151 and the second display area 152.

According to various embodiments, in the unfolded state, the first display area 151 and the second display area 152 may be divided along a specified division line and then may display execution windows of a plurality of applications at the same time. The extending direction of the division line may be parallel or perpendicular to the rotation axis 180. Additional information about a multi-window operation of a folded state or an unfolded state may be provided through FIGS. 2 to 8.

Figure 2:
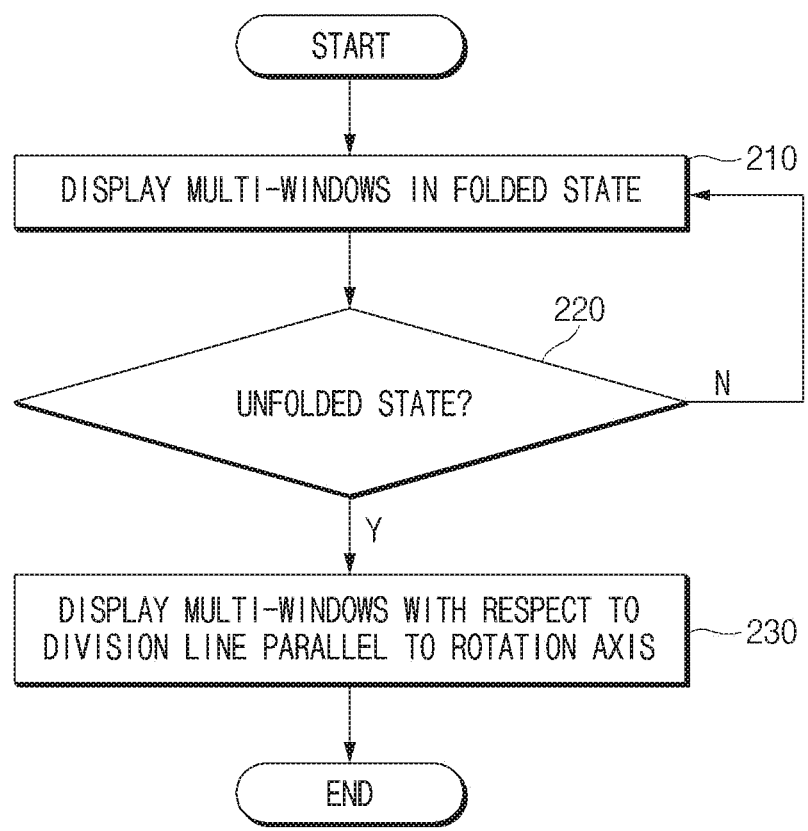
FIG. 2 is a flowchart associated with a method of executing multi-windows, according to various embodiments.

FIG. 2 is a flowchart associated with a method of executing an application, according to various embodiments.

Referring to FIG. 2, in operation 210, an electronic device (e.g., the electronic device 101 of FIG. 1a or the electronic device 105 of FIG. 1b) may display multi-windows of a plurality of applications in a folded state.

For example, in the folded state, the electronic device 101 of FIG. 1a may divide the first display area 111 into an upper area and a lower area, may output a video app in the upper area, and may output an SNS app in the lower area.

For example, in the folded state, the electronic device 105 of FIG. 1b may divide the first display area 151 into an upper area and a lower area, may output a music app in the upper area, and may output in Internet app to the lower area.

In operation 220, a processor may sense whether the state of an electronic device (e.g., the electronic device 101 of FIG. 1a or the electronic device 105 of FIG. 1b) is changed to an unfolded state. For example, the processor may sense whether the body of an electronic device is unfolded, through a sensor.

In operation 230, in the case of the unfolded state, the processor may divide the display with respect to a division line parallel to a rotation axis (e.g., the rotation axis 130 of FIG. 1a or the rotation axis 180 of FIG. 1b) about which a first portion (e.g., the first portion 121 of FIG. 1a or the first portion 161 of FIG. 1b) of the body and a second portion (e.g., the second portion 122 of FIG. 1a or the second portion 162 of FIG. 1b) rotate and then may display multi-windows of a plurality of applications.

For example, in the case of the electronic device 101 having a flexible display in FIG. 1a, when the body 120 is in the folded state, the first display area 111 may be divided, and thus the electronic device 101 may operate as multi-windows. In the case where the body 120 is unfolded, the electronic device 101 may divide the display 110 with respect to the division line parallel to the rotation axis 130 to operate as multi-windows. Additional information about an electronic device having the flexible display may be provided through FIGS. 3a and 3b.

For example, in the case of the electronic device 105 having a dual display in FIG. 1b, when the body 160 is in the folded state, the first display area 151 may be divided, and thus the electronic device 105 may operate as multi-windows. In the case where the body 160 is unfolded, the electronic device 105 may operate as multi-windows with respect to the division line parallel to the rotation axis 180. Additional information about an electronic device having the dual display may be provided through FIGS. 4a and 4b.

Figure 3A:
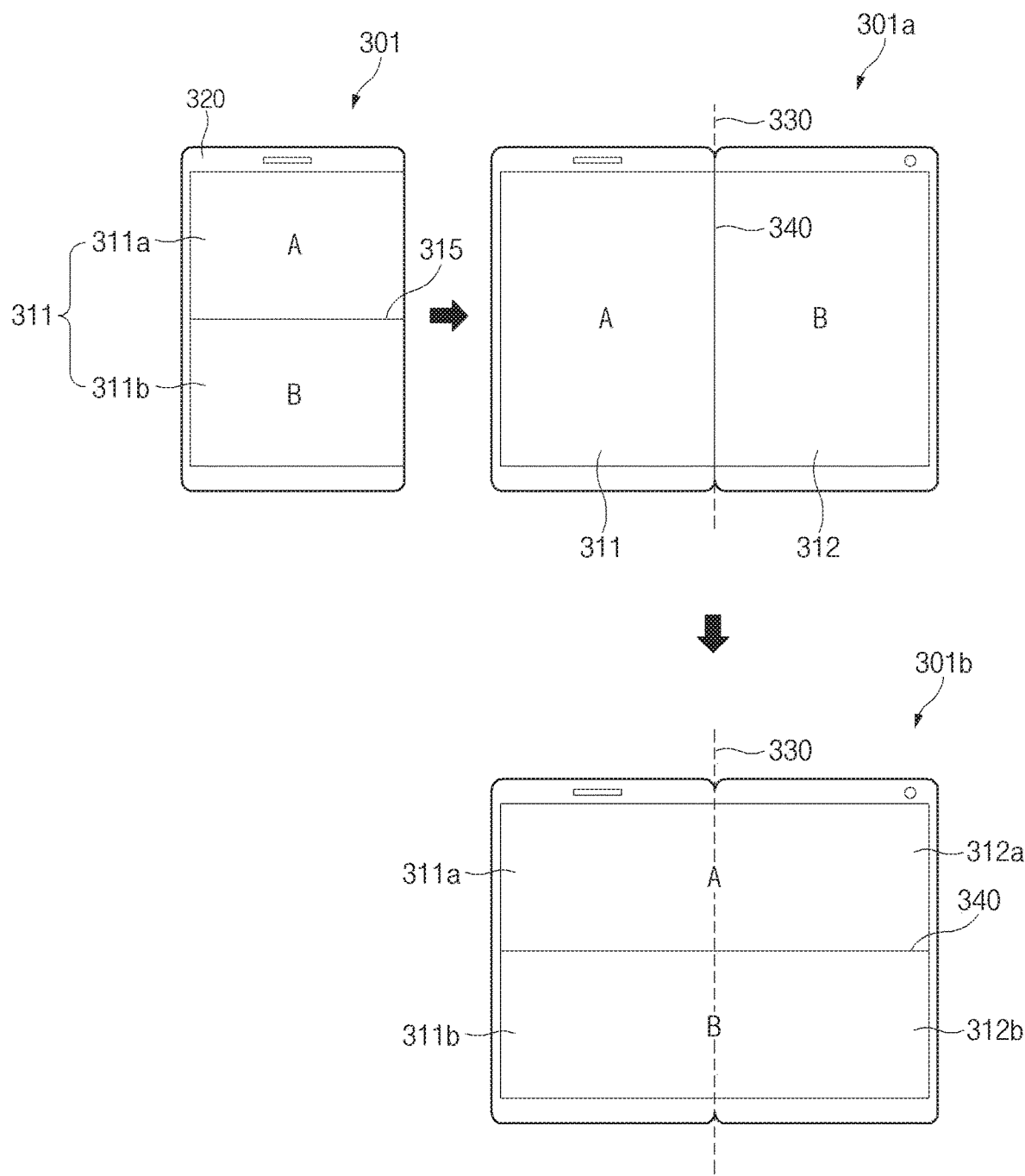
FIG. 3a is a first exemplary view illustrating a multi-window operation in an electronic device having a flexible display, according to various embodiments.

FIG. 3a is a first exemplary view illustrating a multi-window operation in an electronic device having a flexible display, according to various embodiments.

Referring to FIG. 3a, in an electronic device 301 (e.g., the electronic device 101 of FIG. 1a), displays 311 and 312 and a body (or a housing) 320 may be folded or unfolded about a rotation axis 330. In the case where the body 320 is folded, the center area (flexible area) of the displays 311 and 312 may be bent, and the bent area may form a side surface display.

In the case where the body 320 is folded, the first display area 311 and the second display area 312 may face different directions. In the case where the body 320 is unfolded, the first display area 311 and the second display area 312 may be in a planar state facing the same direction.

In the folded state, in the case where the output orientation of the electronic device 301 is a portrait mode, a processor inside the electronic device 301 may divide the first display area 311 along a first division line 315 to execute a first application 'A' and a second application 'B'. The first division line 315 may divide the first display area 311 into a first sub area 311a and a second sub area 311b. The processor may execute the first application 'A' in the first sub area 311a and may execute the second application 'B' in the second sub area 311b.

In the unfolded state 301a, the processor may divide all of the first display area 311 and the second display area 312 along a second division line 340 parallel to a rotation axis 330 to execute the first application 'A' and the second application 'B'. The second division line 340 may be perpendicular to the first division line 315. The second division line 340 may divide the first display area 311 and the second display area 312. The processor may execute the first application 'A' in the first display area 311 and may execute the second application 'B' in the second display area 312.

According to various embodiments, in the case where a separate user input is generated, the processor may change the second division line 340 to be perpendicular to the rotation axis 330 (301b). In the case where the screen division method according to default settings does not correspond to the intended form, the user may change the screen division method by changing the direction of the division line.

In this case, the second division line 340 may divide the first display area 311 into the first sub area 311a and the second sub area 311b. The second division line 340 may divide the second display area 312 into a third sub area 312a and a fourth sub area 312b. The processor may execute the first application 'A' in the first sub area 311a and the third sub area 312a and may execute the second application 'B' in the second sub area 311b and the fourth sub area 312b.

Figure 3B:
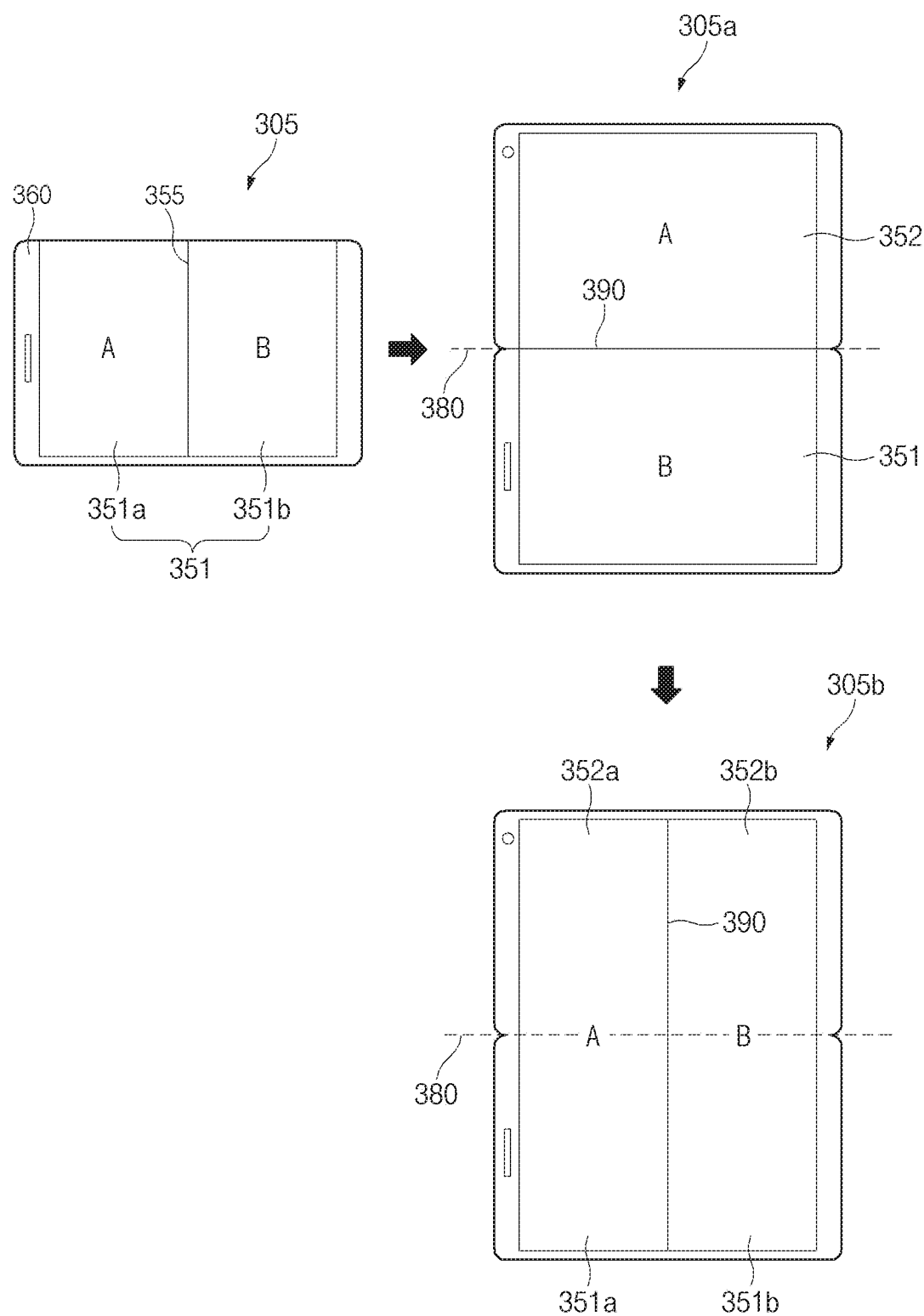
FIG. 3b is a second exemplary view illustrating a multi-window operation in an electronic device having a flexible display, according to various embodiments.

FIG. 3b is a second exemplary view illustrating a multi-window operation in an electronic device having a flexible display, according to various embodiments.

Referring to FIG. 3b, in an electronic device 305 (e.g., the electronic device 101 of FIG. 1a), displays 351 and 352 and a body (or a housing) 360 may be folded or unfolded about a rotation axis 380. In the case where the body 360 is folded, the center area (flexible area) of the displays 351 and 352 may be bent, and the bent area may form a side surface display.

In the case where the body 360 is folded, the first display area 351 and the second display area 352 may face different directions. In the case where the body 360 is unfolded, the first display area 351 and the second display area 352 may be in a planar state facing the same direction.

In the folded state, in the case where the output orientation of the electronic device 305 is a landscape mode, a processor inside the electronic device 305 may divide the first display area 351 along a first division line 355 (perpendicular to the rotation axis 380) to execute a first application 'A' and a second application 'B'. The first division line 355 may divide the first display area 351 into a first sub area 351a and a second sub area 351b. The processor may execute the first application 'A' in the first sub area 351a and may execute the second application 'B' in the second sub area 351b.

In the unfolded state 305a, the processor may divide all of the first display area 351 and the second display area 352 along a second division line 390 parallel to the rotation axis 380 to execute the first application 'A' and the second application 'B'. The second division line 390 may be perpendicular to the first division line 355. The second division line 390 may divide the first display area 351 and the second display area 352. The processor may execute the second application 'B' in the first display area 351 and may execute the first application 'A' in the second display area 352.

According to various embodiments, in the case where a separate user input is generated, the processor may change the second division line 390 to be perpendicular to the rotation axis 380 (305b). In the case where the screen division method according to default settings does not correspond to the intended form, the user may change the screen division method by changing the direction of the division line.

In this case, the second division line 390 may divide the first display area 351 into the first sub area 351a and the second sub area 351b. The second division line 390 may divide the second display area 352 into a third sub area 352a and a fourth sub area 352b. The processor may execute the first application 'A' in the first sub area 351a and the third sub area 352a and may execute the second application 'B' in the second sub area 351b and the fourth sub area 352b.

Figure 4A:
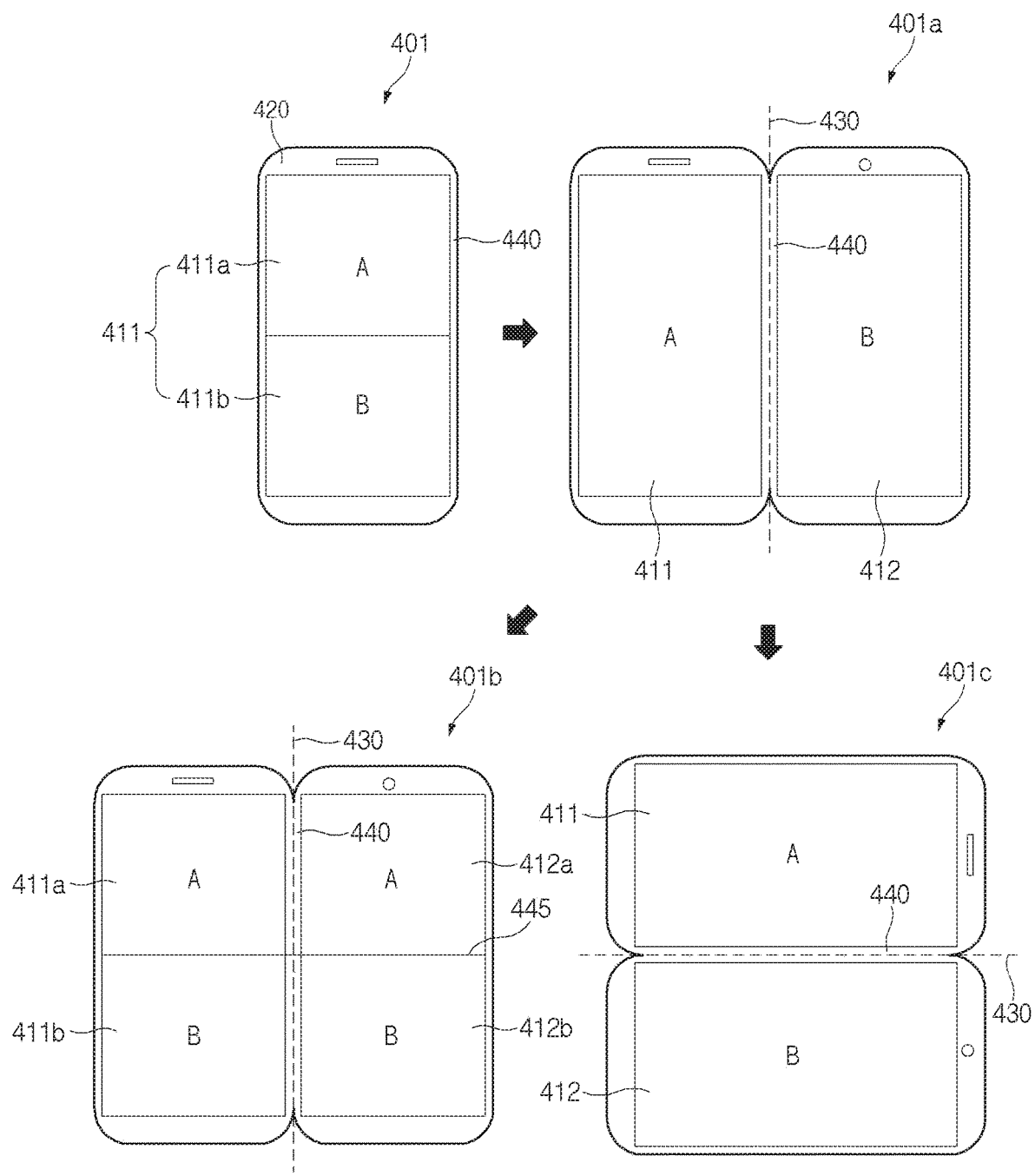
FIG. 4a is a first exemplary view illustrating a multi-window operation in an electronic device having a dual display, according to various embodiments.

FIG. 4a is a first exemplary view illustrating a multi-window operation in an electronic device having a dual display, according to various embodiments.

Referring to FIG. 4a, in an electronic device 401 (e.g., the electronic device 105 of FIG. 1a), a body (or a housing) 420 may be folded or unfolded about a rotation axis 430. In the case where the body 420 is folded, a first display area 411 and a second display area 412 may face different directions. In the case where the body 420 is unfolded, the first display area 411 and the second display area 412 may face different directions. A bezel 440 may be interposed between the first display area 411 and the second display area 412.

In the folded state, in the case where the output orientation of the electronic device 401 is a portrait mode, a processor inside the electronic device 401 may divide the first display area 411 along a first division line 415 to execute a first application 'A' and a second application 'B'. The first division line 415 may divide the first display area 411 into a first sub area 411a and a second sub area 411b. The processor may execute the first application 'A' in the first sub area 411a and may execute the second application 'B' in the second sub area 411b.

In the unfolded state 401a, the processor may divide all of the first display area 411 and the second display area 412 by the bezel 440 extending parallel to the rotation axis 430 to execute the first application 'A' and the second application 'B'. The bezel 440 may physically divide the first display area 411 and the second display area 412. The processor may execute the first application 'A' in the first display area 411 and may execute the second application 'B' in the second display area 412.

According to various embodiments, in the case where a separate user input is generated, the processor may divide all of the first display area 411 and the second display area 412 by a second division line 445 perpendicular to the rotation axis 430 to execute the first application 'A' and the second application 'B' (401b). In the case where the screen division method according to default settings does not correspond to the intended form, the user may change the screen division method by changing the division direction.

In this case, the second division line 445 may divide the first display area 411 into the first sub area 411a and the second sub area 411b. The second division line 445 may divide the second display area 412 into a third sub area 412a and a fourth sub area 412b. The processor may execute the first application 'A' in the first sub area 411a and the third sub area 412a and may execute the second application 'B' in the second sub area 411b and the fourth sub area 412b.

According to various embodiments, in the case where the user changes the orientation of the electronic device 401 (e.g., rotates the electronic device 401 by 90 degrees clockwise), the processor may not change the division direction (401c). The processor may continuously divide all of the first display area 411 and the second display area 412 by the bezel 440 to execute the first application 'A' and the second application 'B'. In this case, the processor may continuously execute the first application 'A' in the first display area 411 and may continuously execute the second application 'B' in the second display area 412. The processor may maintain the execution area of the first application 'A' and the second application 'B' and may allow the user to easily verify the output text or image by changing an output orientation or a UI.

Figure 4B:
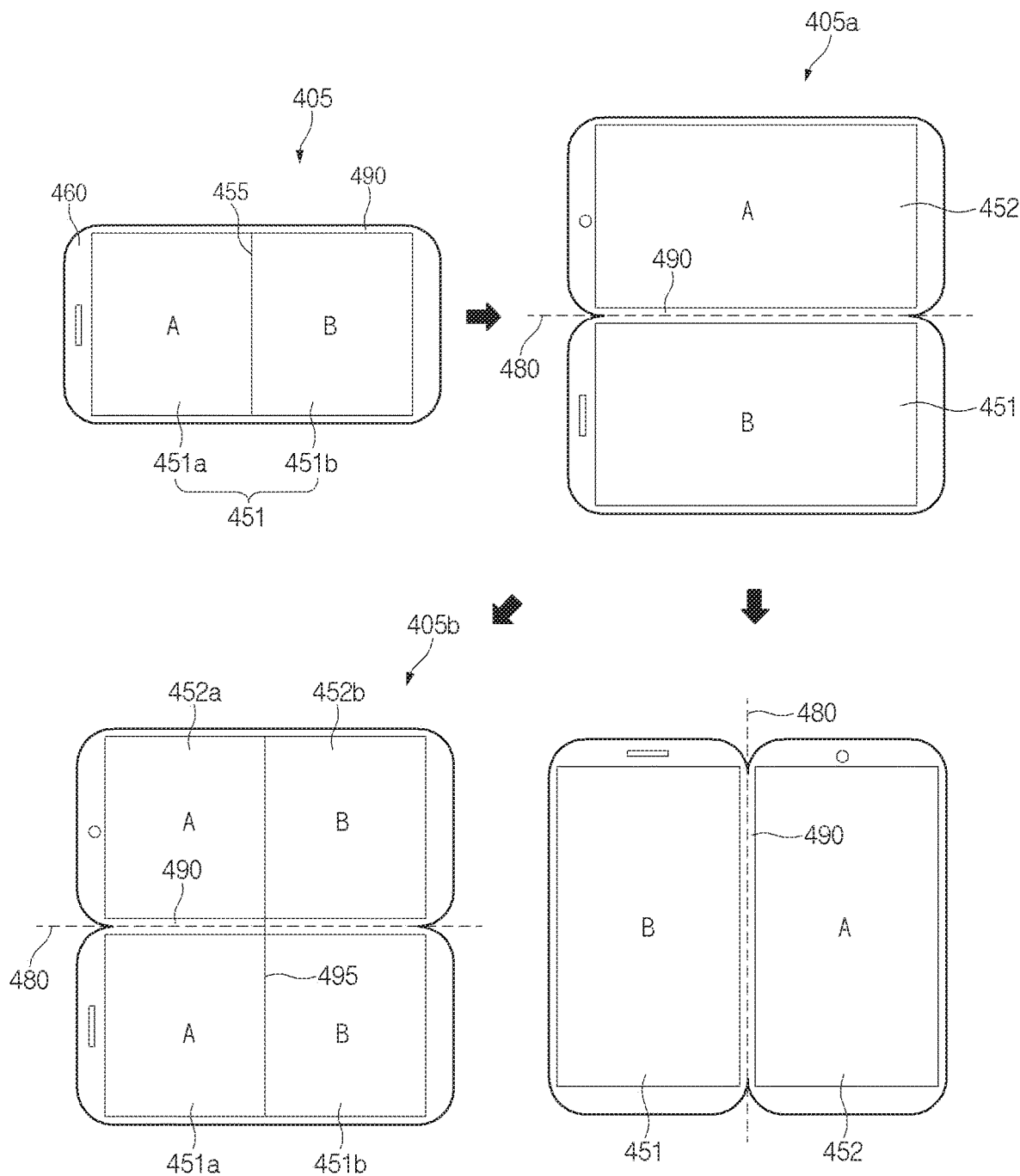
FIG. 4b is a second exemplary view illustrating a multi-window operation in an electronic device having a dual display, according to various embodiments.

FIG. 4b is a second exemplary view illustrating a multi-window operation in an electronic device having a dual display, according to various embodiments.

Referring to FIG. 4b, in an electronic device 405 (e.g., the electronic device 105 of FIG. 1a), a body (or a housing) 460 may be folded or unfolded about a rotation axis 480. In the case where the body 460 is folded, a first display area 451 and a second display area 452 may face different directions. In the case where the body 460 is unfolded, the first display area 451 and the second display area 452 may face the same direction. A bezel 490 may be interposed between the first display area 451 and the second display area 452.

In the folded state, in the case where the output orientation of the electronic device 405 is a landscape mode, a processor may execute a first application 'A' and a second application 'B' in the first display area 451 divided along a first division line 455. The first division line 455 may divide the first display area 451 into a first sub area 451a and a second sub area 451b. The processor may execute the first application 'A' in the first sub area 451a and may execute the second application 'B' in the second sub area 451b.

In the unfolded state 405a, the processor may divide all of the first display area 451 and the second display area 452 by the bezel 490 extending parallel to the rotation axis 480 to execute the first application 'A' and the second application 'B'. The bezel 490 may physically divide the first display area 451 and the second display area 452. The processor may execute the second application 'B' in the first display area 451 and may execute the first application 'A' in the second display area 452.

According to various embodiments, in the case where a separate user input is generated, the processor may divide all of the first display area 451 and the second display area 452 by a second division line 495 perpendicular to the rotation axis 480 to execute the first application 'A' and the second application 'B' (405b). In the case where the screen division method according to default settings does not correspond to the intended form, the user may change the screen division method by changing the division direction.

In this case, the second division line 495 may divide the first display area 451 into the first sub area 451a and the second sub area 451b. The second division line 495 may divide the second display area 452 into a third sub area 452a and a fourth sub area 452b. The processor may execute the first application 'A' in the first sub area 451a and the third sub area 452a and may execute the second application 'B' in the second sub area 451b and the fourth sub area 452b.

According to various embodiments, in the case where the user changes the orientation of the electronic device 405 (e.g., rotates the electronic device 405 by 90 degrees clockwise), the processor may not change the division direction (405c). In this case, the processor may continuously divide all of the first display area 451 and the second display area 452 by the bezel 490 to execute the first application 'A' and the second application 'B'. In an embodiment, the processor may continuously execute the second application 'B' in the first display area 451 and may continuously execute the first application 'A' in the second display area 452. In another embodiment, the processor may execute the first application 'A' in the first display area 451 and may execute the second application 'B' in the second display area 452. The processor may allow the user to easily verify the output text or image by changing output orientations of the first application 'A' and the second application 'B' or a UI.

Figure 5:
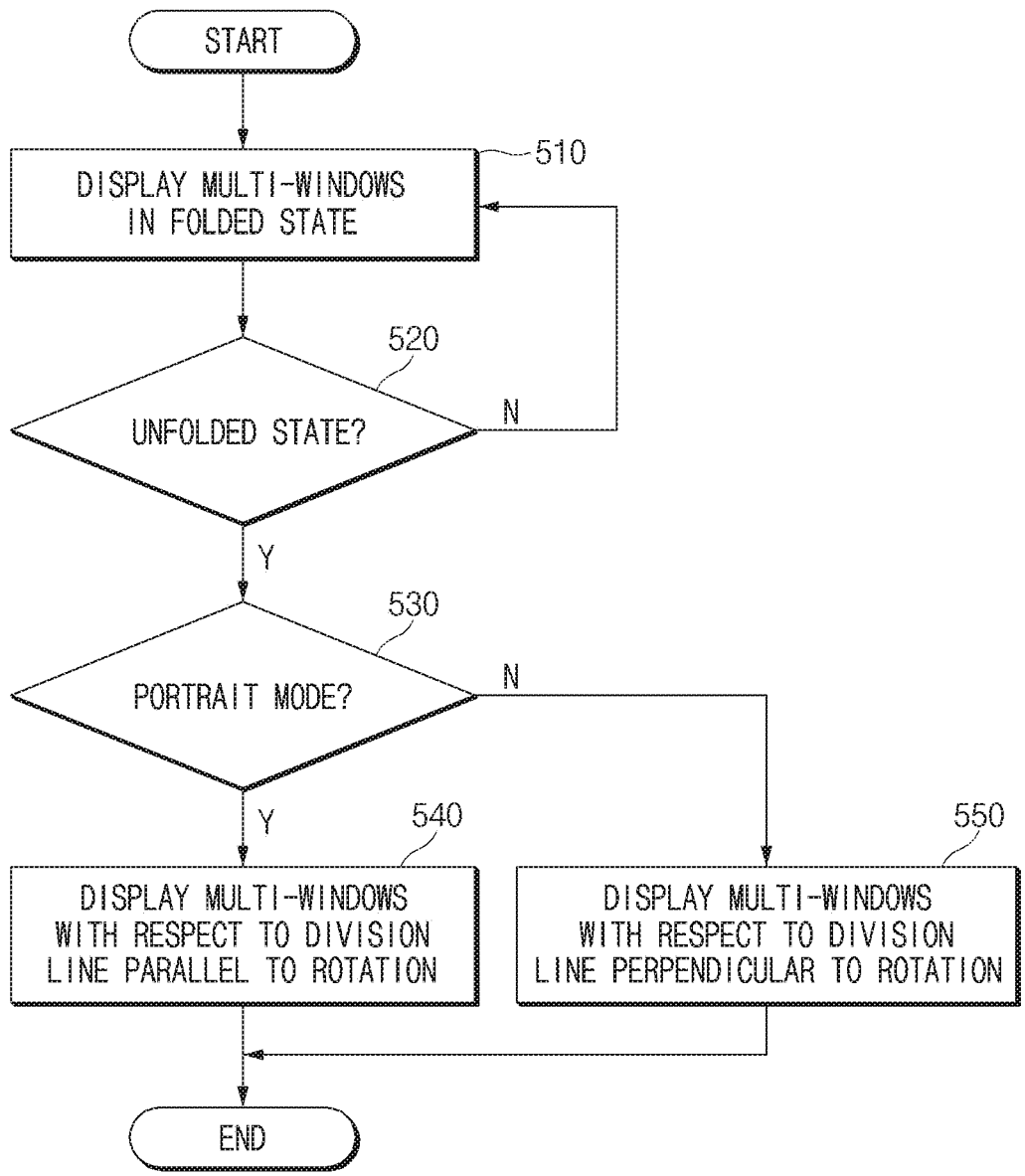
FIG. 5 is a flowchart illustrating a method of executing an application according to an output orientation of a screen, according to various embodiments.

FIG. 5 is a flowchart illustrating a method of executing an application according to an output orientation of a screen, according to various embodiments.

Referring to FIG. 5, in operation 510, an electronic device (e.g., the electronic device 101 of FIG. 1a) may display multi-windows of a plurality of applications in a folded state. For example, the electronic device 101 of FIG. 1a may divide the first display area 111 into an upper area and a lower area, may output a video app in the upper area, and may output an SNS app in the lower area.

In operation 520, a processor may sense whether the state of an electronic device (e.g., the electronic device 101 of FIG. 1a) is changed to an unfolded state. For example, the processor may sense whether the body of an electronic device is unfolded, through a sensor.

In operation 530, the processor may determine whether the output orientation of the electronic device in a folded state is a portrait mode.

In operation 540, in the case where the output orientation of the electronic device 301 in the folded state is a portrait mode, the processor may display multi-windows of a plurality of applications with respect to the division line parallel to a rotation axis about which the first portion and the second portion of a body rotate.

For example, in the case of the electronic device 101 having a flexible display in FIG. 1a, when the body 120 is in the folded state, the electronic device 101 may operate in a portrait mode after the first display area 111 is divided. In the case where the body 120 is unfolded, the processor may display multi-windows of a plurality of applications with respect to the division line parallel to the rotation axis 130. The exemplification associated with the portrait mode may be provided through FIG. 6a.

In operation 550, in the case where the output orientation of the electronic device 301 in the folded state is a landscape mode, the processor may display multi-windows of a plurality of applications with respect to the division line perpendicular to a rotation axis about which the first portion and the second portion of a body rotate.

For example, in the case of the electronic device 101 having a flexible display in FIG. 1a, when the body 120 is in the folded state, the electronic device 101 may operate in a landscape mode after the first display area 111 is divided. In the case where the body 120 is unfolded, the processor may display multi-windows of a plurality of applications with respect to the division line perpendicular to the rotation axis 130. The exemplification associated with the landscape mode may be provided through FIG. 6b.

According to various embodiments, an application executing method performed by an electronic device capable of being folded or unfolded by rotating about a rotation axis may include executing a plurality of applications in a first display area of a display, by a first division line, in a state where the electronic device is folded, determining whether the electronic device is unfolded, and executing the plurality of applications in a first display area and a second display area of the display by a second division line parallel to the rotation axis when the electronic device is unfolded.

According to various embodiments, the application executing method may further include determining whether a separate user input is generated, changing the second division line to be perpendicular to the rotation axis when the user input is generated, and executing the plurality of applications in the first display area and the second display area by the changed second division line.

Figure 6A:
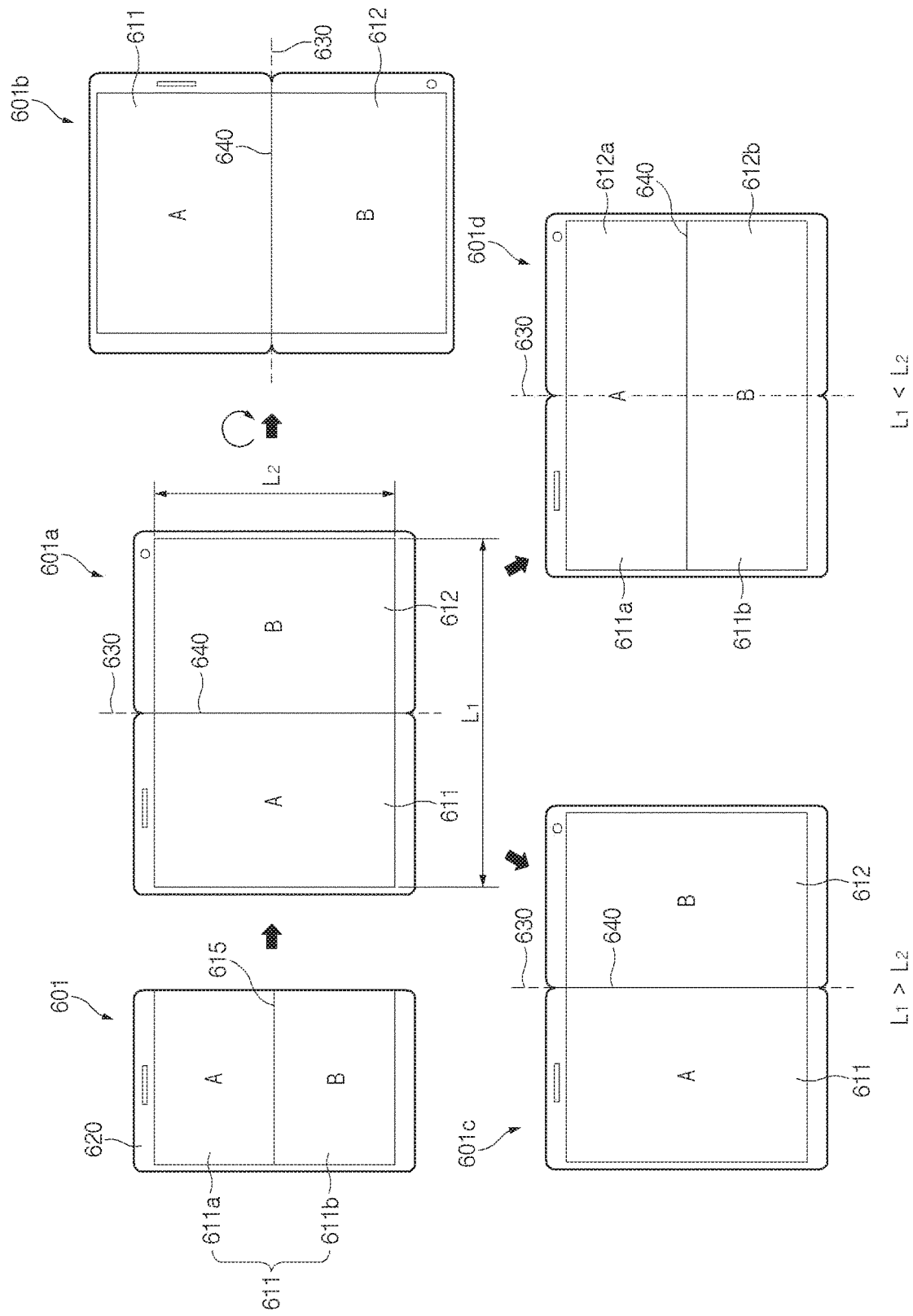
FIG. 6a is a first exemplary view illustrating a multi-window operation in an electronic device having a flexible display, according to various embodiments.

FIG. 6a is a first exemplary view illustrating a multi-window operation in an electronic device having a flexible display, according to various embodiments.

Referring to FIG. 6a, in an electronic device 601 (e.g., the electronic device 101 of FIG. 1a), a display 610 and a body (or a housing) 620 may be folded or unfolded about a rotation axis 630. In the case where the body 620 is folded, the center area (flexible area) of the display 610 may be bent, and the bent area may form a side surface display.

In the case where the body 620 is folded, a first display area 611 and a second display area 612 may face different directions. In the case where the body 620 is unfolded, the first display area 611 and the second display area 612 may be in a planar state facing the same direction.

In the folded state, in the case where the output orientation of the electronic device 601 is a portrait mode, a processor inside the electronic device 601 may divide the first display area 611 along a first division line 615 to execute a first application 'A' and a second application 'B'. The first division line 615 may divide the first display area 611 into a first sub area 611a and a second sub area 611b. The processor may execute the first application 'A' in the first sub area 611a and may execute the second application 'B' in the second sub area 611b.

In the unfolded state 601a, the processor may divide all of the first display area 611 and the second display area 612 along a second division line 640 parallel to the rotation axis 630 to execute the first application 'A' and the second application 'B'. The second division line 640 may be perpendicular to the first division line 615. The second division line 640 may divide the first display area 611 and the second display area 612. The processor may execute the first application 'A' in the first display area 611 and may execute the second application 'B' in the second display area 612.

According to various embodiments, in the case where the user changes the orientation of the electronic device 601 (e.g., rotates the electronic device 601 by 90 degrees clockwise) (601b), the processor may maintain the second division line 640 without changing the second division line 640. In this case, the second division line 640 may be continuously parallel to the rotation axis 630. The processor may continuously execute the first application 'A' in the first display area 611 and may continuously execute the second application 'B' in the second display area 612. The processor may allow the user to easily verify the output text or image by changing output orientations of the first application 'A' and the second application 'B' or a UI.

According to various embodiments, in an unfolded state, the processor may determine the direction of the second division line 640 based on the length (e.g., width) L1 of the first direction of the display 610 and the length (e.g., height) L2 of the second direction of the display 610. According to an embodiment, the processor may allow the second division line 640 to be perpendicular to a direction corresponding to the greater one of the length L1 of the first direction and the length L2 of the second direction.

For example, in the case where the length L1 of the first direction is greater than the length L2 of the second direction, the second division line 640 may extend in a direction perpendicular to the center point of the length L1 of the first direction (a form parallel to the rotation axis 630) (601c).

For another example, in the case where the length L2 of the second direction is greater than the length L1 of the first direction, the second division line 640 may extend in a direction perpendicular to the center point of the length L2 of the second direction (a form perpendicular to the rotation axis 630) (601d).

Figure 6B:
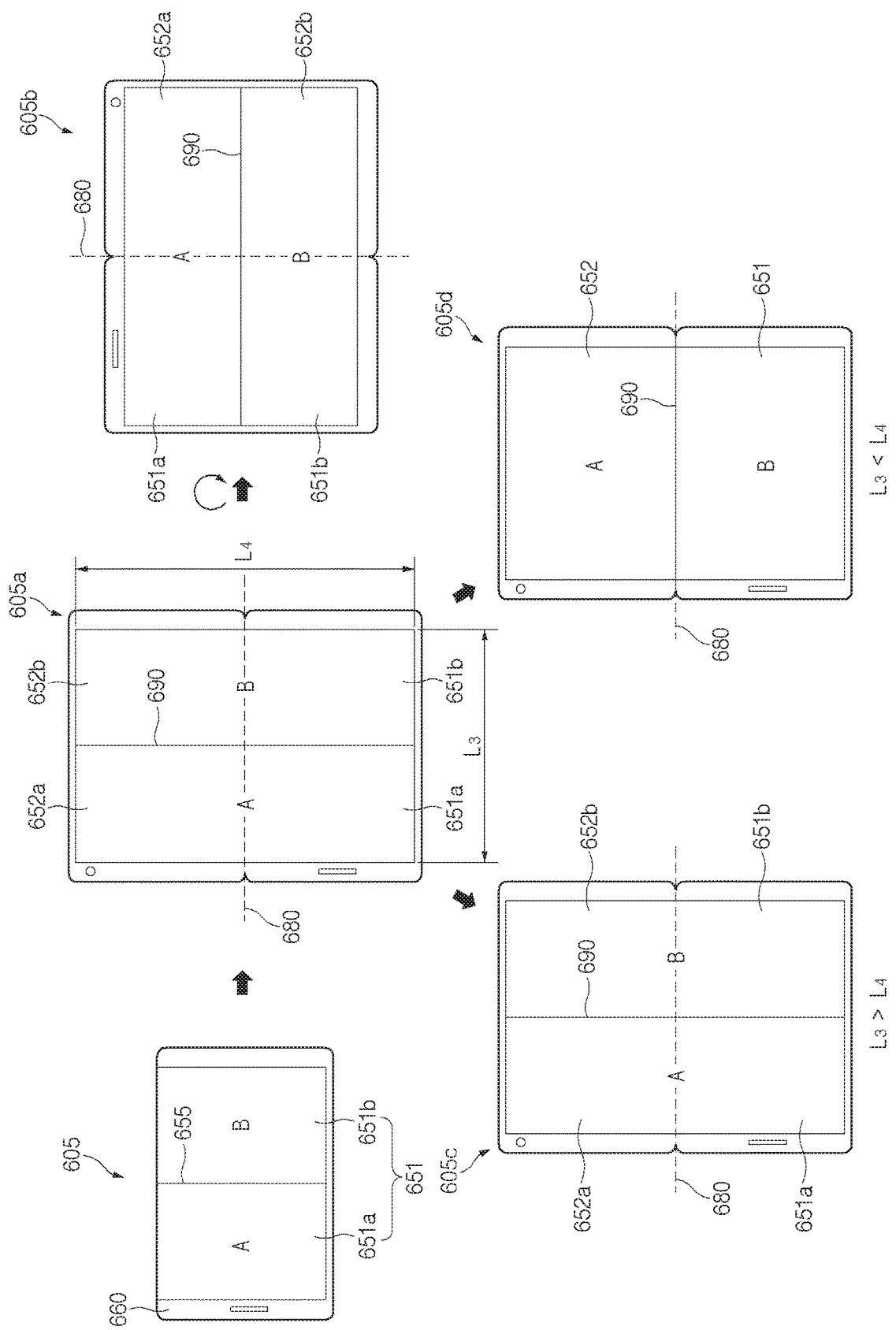
FIG. 6b is a second exemplary view illustrating a multi-window operation in an electronic device having a flexible display, according to various embodiments.

FIG. 6b is a second exemplary view illustrating a multi-window operation in an electronic device having a flexible display, according to various embodiments.

Referring to FIG. 6b, in an electronic device 605 (e.g., the electronic device 101 of FIG. 1a), displays 651 and 652 and a body (or a housing) 660 may be folded or unfolded about a rotation axis 680. In the case where the body 660 is folded, the center area of the displays 651 and 652 may be bent, and the bent area may form a side surface display.

In the case where the body 660 is folded, the first display area 651 and the second display area 652 may face different directions. In the case where the body 660 is unfolded, the first display area 651 and the second display area 652 may be in a planar state facing the same direction.

In the folded state, in the case where the output orientation of the electronic device 605 is a landscape mode, a processor may divide the first display area 651 along a first division line 655 to execute a first application 'A' and a second application 'B'. The first division line 655 may divide the first display area 651 into a first sub area 651a and a second sub area 651b. The processor may execute the first application 'A' in the first sub area 651a and may execute the second application 'B' in the second sub area 651b.

In the unfolded state 605a, the processor may divide all of the first display area 651 and the second display area 652 along a second division line 690 perpendicular to the rotation axis 680 to execute the first application 'A' and the second application 'B'. The second division line 690 may be parallel to the first division line 655. The second division line 690 may divide the first display area 651 into the first sub area 651a and the second sub area 651b. The second division line 690 may divide the second display area 652 into a third sub area 652a and a fourth sub area 652b. The processor may execute the first application 'A' in the first sub area 651a and the third sub area 652a and may execute the second application 'B' in the second sub area 651b and the fourth sub area 652b.

According to various embodiments, in the case where the user changes the orientation of the electronic device 605 (e.g., rotates the electronic device 605 by 90 degrees clockwise) (605b), the processor may maintain the second division line 690 without changing the second division line 690. In this case, the second division line 690 may be continuously perpendicular to the rotation axis 680. The processor may continuously execute the first application 'A' in the first sub area 651a and the third sub area 652a and may continuously execute the second application 'B' in the second sub area 651b and the fourth sub area 652b. The processor may allow the user to easily verify the output text or image by changing output orientations of the first application 'A' and the second application 'B' or a UI.

According to various embodiments, in an unfolded state, the processor may determine the direction of the second division line 690 based on the length (e.g., width) L3 of the first direction of a display (an area including the first display area 651 and the second display area 652) and the length (e.g., height) L4 of the second direction of the display. According to an embodiment, the processor may allow the second division line 690 to be perpendicular to a direction corresponding to the greater one of the length L3 of the first direction and the length L4 of the second direction.

For example, in the case where the length L3 of the first direction is greater than the length L4 of the second direction, the second division line 690 may extend in a direction perpendicular to the center point of the length L3 of the first direction (a form perpendicular to the rotation axis 680) (605c).

For another example, in the case where the length L4 of the second direction is greater than the length L3 of the first direction, the second division line 690 may extend in a direction perpendicular to the center point of the length L4 of the second direction (a form parallel to the rotation axis 680) (605d).

FIG. 7a is an exemplification diagram illustrating execution of a pair icon in a folded state, according to various embodiments.

Referring to FIG. 7a, in an electronic device 701 (e.g., the electronic device 105 of FIG. 1a), a body (or a housing) 720 may be folded or unfolded about a rotation axis 730. In the case where the body 720 is folded, a first display area 711 and a second display area 712 may face different directions. In the case where the body 720 is unfolded, the first display area 711 and the second display area 712 may face the same direction. A bezel 740 may be interposed between the first display area 711 and the second display area 712.

In a folded state, the processor may display a pair icon 701-1 in at least part of the first display area 711. The pair icon 701-1 may be an icon configured to execute a plurality of applications in a multi-window scheme depending on specified placement (or specified order). In the case where the pair icon 701-1 is selected by a user input, the processor may execute a first application 'A' and a second application 'B' that are linked to the pair icon 701-1.

In the case where the output orientation of the electronic device 701 is a portrait mode, the processor may divide and display the first application 'A' and the second application 'B' by a first division line 715. The first division line 715 may divide the first display area 711 into a first sub area 711a and a second sub area 711b. The processor may execute the first application 'A' in the first sub area 711a and may execute the second application 'B' in the second sub area 711b (701a).

In the unfolded state 701b, the processor may execute the first application 'A' and the second application 'B' in the first display area 711 and the second display area 712 divided by the bezel 740 extending parallel to the rotation axis 730. The bezel 740 may extend in a direction perpendicular to the first division line 715. The bezel 740 may physically divide the first display area 711 and the second display area 712. The processor may execute the first application 'A' in the first display area 711 and may execute the second application 'B' in the second display area 712.

Figure 7B:
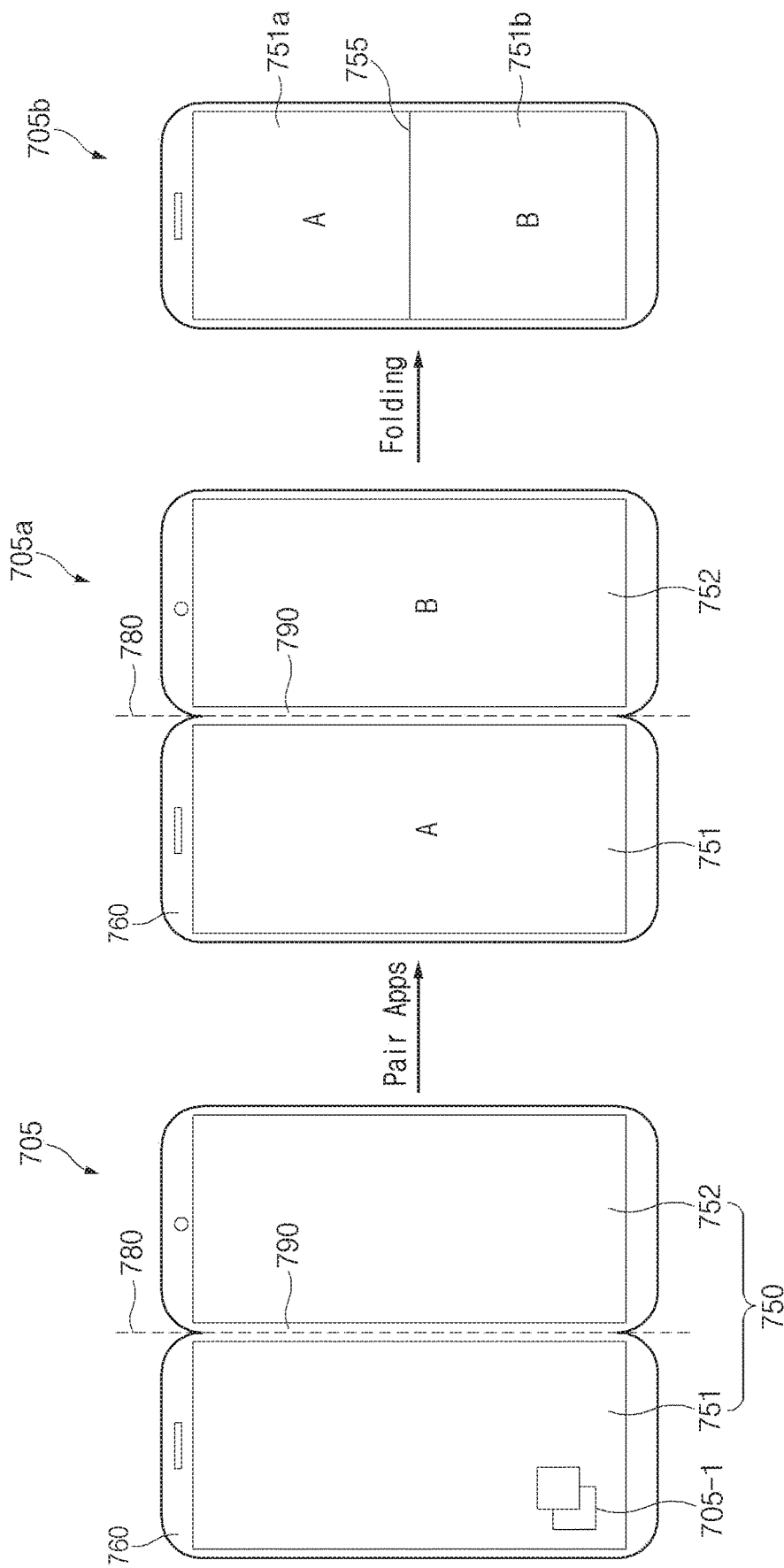
FIG. 7b is an exemplification diagram illustrating execution of a pair icon in an unfolded state, according to various embodiments.

FIG. 7b is an exemplification diagram illustrating execution of a pair icon in an unfolded state, according to various embodiments.

Referring to FIG. 7b, in an electronic device 705 (e.g., the electronic device 105 of FIG. 1a), a body (or a housing) 760 may be folded or unfolded about a rotation axis 780. In the case where the body 760 is folded, a first display area 751 and a second display area 752 may face different directions. In the case where the body 760 is unfolded, the first display area 751 and the second display area 752 may face the same direction. A bezel 790 may be interposed between the first display area 751 and the second display area 752.

In an unfolded state, the processor may display a pair icon 705-1 in at least part of the first display area 751 or the second display area 752. The pair icon 705-1 may be an icon configured to execute a plurality of applications in a multi-window scheme depending on specified placement (or specified order). In the case where the pair icon 705-1 is selected by a user input, the processor may execute a first application 'A' and a second application 'B' that are linked to the pair icon 705-1 (705*a*).

The processor may execute the first application 'A' and the second application 'B' in the first display area 751 and the second display area 752 divided by the bezel 790 extending parallel to the rotation axis 780. The bezel 790 may physically divide the first display area 751 and the second display area 752. Depending on the order set to the pair icon 705-1, the processor may execute the first application 'A' in the first display area 751 and may execute the second application 'B' in the second display area 752.

In the case where a user folds the body 760 (705*b*), when the output orientation of the electronic device 705 is a portrait mode, the processor may divide and display the first application 'A' and the second application 'B' by a first division line 755. The first division line 715 may divide the first display area 751 into a first sub area 751*a* and a second sub area 751*b*. The processor may execute the first application 'A' in the first sub area 751*a* and may execute the second application 'B' in the second sub area 751*b*. The first division line 715 may be perpendicular to the extension direction of the bezel 790.

Figure 8:
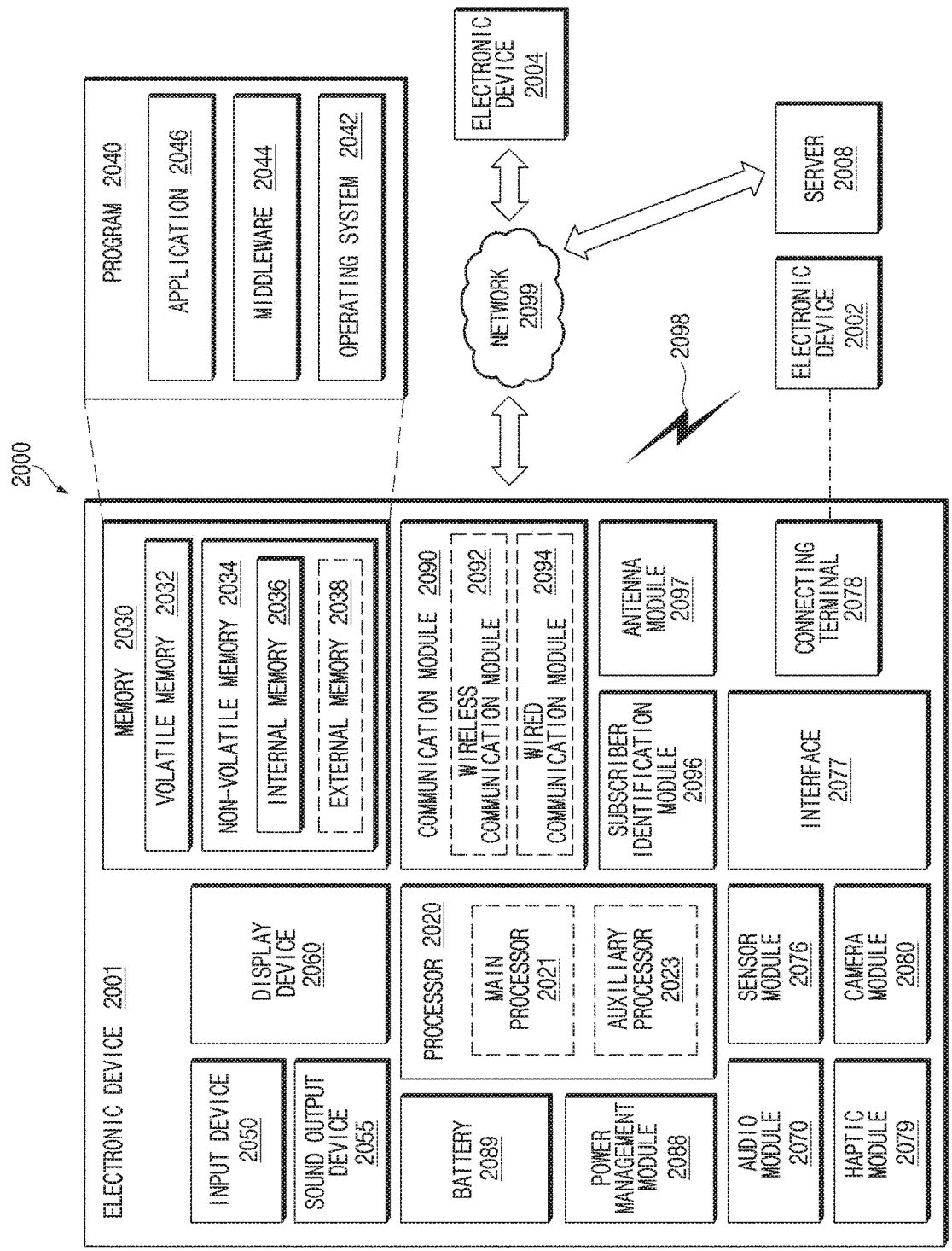
FIG. 8 is a block diagram of an electronic device in a network environment, according to various embodiments.

FIG. 8 is a block diagram showing an electronic device 2001 in a network environment 2000 according to various embodiments.

Referring to FIG. 8, the electronic device 2001 (e.g., the electronic device 101 shown in FIG. 1*a* or the electronic device 105 shown in FIG. 1*b*) may communicate with an electronic device 2002 via a first network 2098 (e.g., a short-range wireless communication) or may communicate with an electronic device 2004 or a server 2008 via a second network 2099 (e.g., a long-distance wireless communication) in the network environment 2000. According to an embodiment, the electronic device 2001 may communicate with the electronic device 2004 via the server 2008. According to an embodiment, the electronic device 2001 may include a processor 2020, a memory 2030, an input device 2050, a sound output device 2055, a display device 2060, an audio module 2070, a sensor module 2076, an interface 2077, a haptic module 2079, a camera module 2080, a power management module 2088, a battery 2089, a communication module 2090, a subscriber identification module 2096, and an antenna module 2097. According to an embodiment, at least one component (e.g., the display device 2060 or the camera module 2080) among the components of the electronic device 2001 may be omitted, or other components may be added to the electronic device 2001. According to an embodiment, some components may be integrated and implemented as in the case of the sensor module 2076 (e.g., a fingerprint sensor, an iris sensor, or an illuminance sensor) embedded in the display device 2060 (e.g., a display).

The processor 2020 may operate, for example, software (e.g., a program 2040) to control at least one of other components (e.g., hardware or software components) of the electronic device 2001 connected to the processor 2020 and may process and compute a variety of data. The processor 2020 may load an instruction or data, which is received from other components (e.g., the sensor module 2076 or the communication module 2090), into a volatile memory 2032, may process the loaded instruction or data, and may store result data into a nonvolatile memory 2034. According to an embodiment, the processor 2020 may include a main processor 2021 (e.g., a central processing unit or an application processor) and an auxiliary processor 2023 (e.g., a graphic processing device, an image signal processor, a sensor hub processor, or a communication processor), which operates independently from the main processor 2021, additionally or alternatively uses less power than the main processor 2021, or is specified to a designated function. In this case, the auxiliary processor 2023 may operate separately from the main processor 2021 or may be embedded into the main processor 2021.

In this case, the auxiliary processor 2023 may control, for example, at least some of functions or states associated with at least one component (e.g., the display device 2060, the sensor module 2076, or the communication module 2090) among the components of the electronic device 2001 instead of the main processor 2021 while the main processor 2021 is in an inactive (e.g., sleep) state or together with the main processor 2021 while the main processor 2021 is in an active (e.g., an application execution) state. According to an embodiment, the auxiliary processor 2023 (e.g., the image signal processor or the communication processor) may be implemented as a part of another component (e.g., the camera module 2080 or the communication module 2090) that is functionally related to the auxiliary processor 2023. The memory 2030 may store a variety of data used by at least one component (e.g., the processor 2020 or the sensor module 2076) of the electronic device 2001, for example, software (e.g., the program 2040) and input data or output data with respect to instructions associated with the software. The memory 2030 may include the volatile memory 2032 or the nonvolatile memory 2034.

The program 2040 may be stored in the memory 2030 as software and may include, for example, an operating system 2042, a middleware 2044, or an application 2046.

The input device 2050 may be a device for receiving an instruction or data, which is used for a component (e.g., the processor 2020) of the electronic device 2001, from an outside (e.g., a user) of the electronic device 2001 and may include, for example, a microphone, a mouse, or a keyboard.

The sound output device 2055 may be a device for outputting a sound signal to the outside of the electronic device 2001 and may include, for example, a speaker used for general purposes, such as multimedia play or recordings play, and a receiver used only for receiving calls. According to an embodiment, the receiver and the speaker may be either integrally or separately implemented.

The display device 2060 (e.g., the display 110 shown in FIG. 1) may be a device for visually presenting information to the user and may include, for example, a display, a hologram device, or a projector and a control circuit for controlling a corresponding device. According to an embodiment, the display device 2060 may include a touch circuitry or a pressure sensor for measuring an intensity of pressure on the touch.

The audio module 2070 may convert a sound and an electrical signal in dual directions. According to an embodiment, the audio module 2070 may obtain the sound through the input device 2050 or may output the sound through the sound output device 2055 or an external electronic device (e.g., the electronic device 2002 (e.g., a speaker or a headphone)) wired or wirelessly connected to the electronic device 2001.

The sensor module 2076 may generate an electrical signal or a data value corresponding to an operating state (e.g., power or temperature) inside or an environmental state outside the electronic device 2001. The sensor module 2076 may include, for example, a gesture sensor, a gyro sensor, a pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 2077 may support a designated protocol wired or wirelessly connected to the external electronic device (e.g., the electronic device 2002). According to an embodiment, the interface 2077 may include, for example, an HDMI (high-definition multimedia interface), a USB (universal serial bus) interface, an SD card interface, or an audio interface.

A connection terminal 2078 may include a connector that physically connects the electronic device 2001 to the external electronic device (e.g., the electronic device 2002), for example, an HDMI connector, a USB connector, an SD card connector, or an audio connector (e.g., a headphone connector).

The haptic module 2079 may convert an electrical signal to a mechanical stimulation (e.g., vibration or movement) or an electrical stimulation perceived by the user through tactile or kinesthetic sensations. The haptic module 2079 may include, for example, a motor, a piezoelectric device, or an electric stimulator.

The camera module 2080 may take a still image or a video image. According to an embodiment, the camera module 2080 may include, for example, at least one lens, an image sensor, an image signal processor, or a flash.

The power management module 2088 may be a module for managing power supplied to the electronic device 2001 and may serve as at least a part of a power management integrated circuit (PMIC).

The battery 2089 may be a device for supplying power to at least one component of the electronic device 2001 and may include, for example, a non-rechargeable (primary) battery, a rechargeable (secondary) battery, or a fuel cell.

The communication module 2090 may establish a wired or wireless communication channel between the electronic device 2001 and the external electronic device (e.g., the electronic device 2002, the electronic device 2004, or the server 2008) and support communication execution through the established communication channel. The communication module 2090 may include at least one communication processor operating independently from the processor 2020 (e.g., the application processor) and supporting the wired communication or the wireless communication. According to an embodiment, the communication module 2090 may include a wireless communication module 2092 (e.g., a cellular communication module, a short-range wireless communication module, or a GNSS (global navigation satellite system) communication module) or a wired communication module 2094 (e.g., an LAN (local area network) communication module or a power line communication module) and may communicate with the external electronic device using a corresponding communication module among them through the first network 2098 (e.g., the short-range communication network such as a Bluetooth, a WiFi direct, or an IrDA (infrared data association)) or the second network 2099 (e.g., the long-distance communication network such as a cellular network, an internet, or a computer network (e.g., LAN or WAN)). The above-mentioned various communication modules 2090 may be implemented into one chip or into separate chips, respectively.

According to an embodiment, the wireless communication module 2092 may identify and authenticate the electronic device 2001 using user information stored in the subscriber identification module 2096 in the communication network.

The antenna module 2097 may include one or more antennas to transmit or receive the signal or power to or from an external source. According to an embodiment, the communication module 2090 (e.g., the wireless communication module 2092) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., an instruction or data) with each other.

According to an embodiment, the instruction or data may be transmitted or received between the electronic device 2001 and the external electronic device 2004 through the server 2008 connected to the second network 2099. Each of the electronic devices 2002 and 2004 may be the same or different types as or from the electronic device 2001. According to an embodiment, all or some of the operations performed by the electronic device 2001 may be performed by another electronic device or a plurality of external electronic devices. When the electronic device 2001 performs some functions or services automatically or by request, the electronic device 2001 may request the external electronic device to perform at least some of the functions related to the functions or services, in addition to or instead of performing the functions or services by itself. The external electronic device receiving the request may carry out the requested function or the additional function and transmit the result to the electronic device 2001. The electronic device 2001 may provide the requested functions or services based on the received result as is or after additionally processing the received result. To this end, for example, a cloud computing, distributed computing, or client-server computing technology may be used.

According to various embodiments of the present disclosure, an electronic device may include a body including a first portion and a second portion, a display including a first display area and a second display area, and a processor embedded inside the body. The first portion and the second portion may rotate about a rotation axis. The first display area may be disposed in the first portion. The second display area may be disposed in the second portion. The processor may be configured to execute a plurality of applications in the first display area by a first division line in a state where the body is folded by rotation of the first portion and the second portion and to execute the plurality of applications in the first display area and the second display area by a second division line parallel to the rotation axis in a state where the body is unfolded by the rotation of the first portion and the second portion.

According to various embodiments of the present disclosure, the first display area and the second display area are implemented with one display panel.

According to various embodiments of the present disclosure, the display includes a flexible area between the first display area and the second display area. The flexible area is disposed on a side surface of the first portion and the second portion, in a state where the body is folded.

According to various embodiments of the present disclosure, the first display area and the second display area are implemented with different display panels, respectively.

According to various embodiments of the present disclosure, at least part of the body forms a bezel for dividing the first display area and the second display area, in an area adjacent to the rotation axis. The processor is configured to when a separate user input is generated, change the second division line to be perpendicular to the rotation axis.

According to various embodiments of the present disclosure, the first division line is perpendicular to the rotation axis. The first division line divides the first display area into a first sub area and a second sub area, in a state where the first portion and the second portion are folded, and the processor is configured to execute a first application in the first sub area; and execute a second application in the second sub area. The processor is configured to in a state where the first portion and the second portion are unfolded, execute the first application in the first display area, and execute the second application in the second display area.

According to various embodiments of the present disclosure, the first display area faces a first direction and the second display area faces in a second direction opposite to the first direction in a state where the body is folded.

According to various embodiments of the present disclosure, an electronic device includes a body including a first portion and a second portion, a display including a first display area, a second display area, and a flexible area, and a processor embedded inside the body, wherein the first portion and the second portion rotate about a rotation axis, wherein the first display area is disposed in the first portion, wherein the second display area is disposed in the second portion, wherein the flexible area is interposed between the first display area and the second display area so as to be adjacent to the rotation axis, wherein the processor is configured to in a state where the body is folded by rotation of the first portion and the second portion, execute a plurality of applications in the first display area by a first division line, when the body is unfolded by the rotation of the first portion and the second portion, verify an output orientation of the first display area, and execute the plurality of applications in the first display area and the second display area by a second division line, a direction of which is changed depending on the output orientation.

According to various embodiments of the present disclosure, the processor is configured to when the output orientation of the first display area is a portrait mode in a state where the body is folded, when the body is unfolded, execute the plurality of applications by the second division line parallel to the rotation axis.

According to various embodiments of the present disclosure, the processor is configured to when the output orientation of the first display area is a portrait mode in a state where the body is folded, execute the plurality of applications by the second division line perpendicular to the rotation axis when the body is unfolded.

According to various embodiments of the present disclosure, the processor is configured to when the output orientation of the first display area is a landscape mode in a state where the body is folded, execute the plurality of applications by the second division line perpendicular to the rotation axis when the body is unfolded.

According to various embodiments of the present disclosure, the processor is configured to, when the output orientation of the first display area is a landscape mode in a state where the body is folded, execute the plurality of applications by the second division line parallel to the rotation axis when the body is unfolded.

According to various embodiments of the present disclosure, the first division line divides the first display area into a first sub area and a second sub area, in a state where the body is folded, and the processor is configured to execute a first application in the first sub area, and execute a second application in the second sub area.

According to various embodiments of the present disclosure, the processor is configured to, in a state where the body is unfolded, execute the first application in the first display area, and execute the second application in the second display area.

According to various embodiments, the first camera may include the telephoto lens, and the second camera may include the wide-angle lens. Each component (e.g., the module or the program) according to various embodiments may include at least one of the above elements, and a portion of the above sub-components may be omitted, or additional other sub-components may be further included. Alternatively or additionally, some components (e.g., the module or the program) may be integrated in one element and may perform the same or similar functions performed by each corresponding component prior to the integration. Operations performed by a module, a program, or other components according to various embodiments of the present disclosure may be executed sequentially, in parallel, repeatedly, or in a heuristic method. Also, at least some operations may be executed in different sequences, omitted, or other operations may be added.

The invention claimed is:
1. An electronic device comprising:
   a body including a first portion and a second portion;
   a display including a first display area and a second display area; and
   a processor embedded inside the body,
   wherein the first portion and the second portion rotate about a rotation axis,
   wherein the first display area is disposed in the first portion,
   wherein the second display area is disposed in the second portion, and
   wherein the processor is configured to:
      in a first state where the body is folded by rotation of the first portion and the second portion, execute a plurality of applications in the first display area by a first division line,
      determine an operation mode of the display in the first state,
      in a second state where the body is unfolded by the rotation of the first portion and the second portion and the determined operation mode is a portrait mode, execute the plurality of applications in the first display area and the second display area by a second division line parallel to the rotation axis, and
      in a third state where the body is unfolded by the rotation of the first portion and the second portion and the determined operation mode is a landscape mode, execute the plurality of applications in the first display area and the second display area by a third division line perpendicular to the rotation axis.

2. The electronic device of claim 1, wherein the first display area and the second display area are implemented with one display panel.

3. The electronic device of claim 1, wherein the display includes a flexible area between the first display area and the second display area.

4. The electronic device of claim 3, wherein the flexible area is disposed on a side surface of the first portion and the second portion, in a state where the body is folded.

5. The electronic device of claim 1, wherein the first display area and the second display area are implemented with different display panels, respectively.

6. The electronic device of claim 1, wherein at least part of the body forms a bezel for dividing the first display area and the second display area, in an area adjacent to the rotation axis.

7. The electronic device of claim 1, wherein the processor is further configured to, when a separate user input is generated, change the second division line to the third division line.

8. The electronic device of claim 1, wherein the first division line is perpendicular to the rotation axis.

9. The electronic device of claim 1,
wherein the first division line divides the first display area into a first sub area and a second sub area, in a state where the first portion and the second portion are folded, and
wherein the processor is configured to:
execute a first application in the first sub area, and
execute a second application in the second sub area.

10. The electronic device of claim 9, wherein the processor is further configured to, in the second state where the first portion and the second portion are unfolded, execute the first application in the first display area, and execute the second application in the second display area.

11. The electronic device of claim 1, wherein the first display area faces a first direction and the second display area faces in a second direction opposite to the first direction in the second state or the third state.

12. An application executing method performed by an electronic device capable of being folded or unfolded by rotating about a rotation axis, the method comprising:
in a first state where the electronic device is folded, executing a plurality of applications in a first display area of a display, by a first division line;
determining an operation mode of the display in the first state;
determining whether the electronic device is unfolded;
when the electronic device is unfolded and the determined operation mode is a portrait mode, executing the plurality of applications in the first display area and a second display area of the display by a second division line parallel to the rotation axis; and
when the electronic device is unfolded and the determined operation mode is a landscape mode, executing the plurality of applications in the first display area and a second display area of the display by a second division line perpendicular to the rotation axis.

* * * * *